(12) United States Patent
Hämäläinen

(10) Patent No.: US 10,703,453 B2
(45) Date of Patent: Jul. 7, 2020

(54) MARINE VESSEL

(71) Applicant: Meyer Turku Oy, Turku (FI)

(72) Inventor: Raimo Hämäläinen, Turku (FI)

(73) Assignee: Meyer Turku Oy, Turku (FI)

( * ) Notice: Subject to any disclaimer, the term of this patent is extended or adjusted under 35 U.S.C. 154(b) by 0 days.

(21) Appl. No.: 16/230,500

(22) Filed: Dec. 21, 2018

(65) Prior Publication Data

US 2019/0193824 A1 Jun. 27, 2019

(30) Foreign Application Priority Data

Dec. 22, 2017 (EP) .................................. 17209946

(51) Int. Cl.
| | |
|---|---|
| *B63H 5/07* | (2006.01) |
| *B63H 5/08* | (2006.01) |
| *B63B 1/08* | (2006.01) |
| *B63H 1/28* | (2006.01) |
| *B63B 73/00* | (2020.01) |
| *B63B 1/04* | (2006.01) |
| *B63B 3/42* | (2006.01) |

(Continued)

(52) U.S. Cl.
CPC ................. *B63H 5/08* (2013.01); *B63B 1/04* (2013.01); *B63B 1/08* (2013.01); *B63B 3/42* (2013.01); *B63B 73/00* (2020.01); *B63H 1/28* (2013.01); *B63H 2005/1254* (2013.01); *B63H 2025/425* (2013.01)

(58) Field of Classification Search
CPC .... B63B 1/04; B63B 1/08; B63B 3/42; B63B 9/06; B63H 1/28; B63H 5/08; B63H 5/07
See application file for complete search history.

(56) References Cited

U.S. PATENT DOCUMENTS

| | | | | |
|---|---|---|---|---|
| 1,679,388 A | * | 8/1928 | Troth ........................ | B63B 3/42 |
| | | | | 384/258 |
| 2,371,013 A | * | 3/1945 | Wosenitz ............... | B63H 23/30 |
| | | | | 440/75 |

(Continued)

FOREIGN PATENT DOCUMENTS

| | | |
|---|---|---|
| EP | 2993122 A1 | 3/2016 |
| WO | 03066428 A1 | 8/2003 |
| WO | 2009126090 A1 | 10/2009 |

OTHER PUBLICATIONS

Search Report for related European Application No. 17209946; report dated Jun. 6, 2018.

*Primary Examiner* — Stephen P Avila
(74) *Attorney, Agent, or Firm* — Miller, Matthias & Hull LLP

(57) ABSTRACT

A marine vessel has a hull with a bottom, a bow, a stern, and a propulsion arrangement including at least three propulsion units arranged at the stern of the marine vessel. The marine vessel has a base line and a centerline. The at least three propulsion units include a fixed centerline shaft propulsion unit with a shaft line and a propeller, and two turnable propulsion units with respective propellers and arranged at opposite sides of the fixed centerline shaft propulsion unit for steering of the marine vessel. For improving thrust efficiency, while maintaining optimal steering capability, the propeller of the fixed centerline shaft propulsion unit is arranged at a given distance aft of the stern of the marine vessel.

28 Claims, 6 Drawing Sheets

(51) Int. Cl.
  *B63H 25/42* (2006.01)
  *B63H 5/125* (2006.01)

(56) References Cited

U.S. PATENT DOCUMENTS

| | | | | |
|---|---|---|---|---|
| 2,891,825 A | * | 6/1959 | Barrett | B63B 3/42 |
| | | | | 384/258 |
| 4,383,829 A | * | 5/1983 | Allen, Jr. | B63H 1/18 |
| | | | | 440/66 |
| 6,250,240 B1 | | 6/2001 | Thiger et al. | |
| 2016/0068237 A1 | * | 3/2016 | Curts | B63B 3/54 |
| | | | | 114/363 |
| 2016/0318586 A1 | * | 11/2016 | Lavini | B63B 1/32 |

* cited by examiner

MARINE VESSEL

FIELD

The present disclosure relates to a marine vessel with a hull with a bottom, a bow, a stern, which marine vessel is provided with a propulsion arrangement including at least three propulsion units arranged at the stern of the marine vessel, and which marine vessel has a base line and a centerline, wherein the at least three propulsion units include a fixed centerline shaft propulsion unit with a shaft line and a propeller and two turnable propulsion units with respective propellers and arranged at opposite sides of the fixed centerline shaft propulsion unit for steering of the marine vessel. The present disclosure also relates to a propulsion arrangement and a method for providing a marine vessel with a propulsion arrangement.

BACKGROUND

Providing marine vessels with at least three propulsion units in the stern is known from prior art. Examples of such solutions can be found e.g. in WO 03/066428 A1, WO 03/099651 A1, WO 2006/048460 A1 and WO 2009/007497 A2. These known solutions are mainly concerned with optimizing the loading capacity of the vessels, maintaining a balanced efficiency for cruise speeds and maneuvering, and allowing operation in ice infested waters. In all these, and other corresponding solutions, the propulsion units are located under the bottom of the hull of the vessel, closer or farther away from the stern of the vessel. Consequently, these solutions pose limits on the propellers used as well as generate hull vibrations leading to undesired hull fatigue and noise.

There are also known solutions, e.g. as disclosed in WO 2009/126090 A1, WO 2009/126096 A1 and EP 2 993 122 A1, where attempts have been made to avoid the above indicated problems. The known solution of '090 discloses a marine vessel with a single or twin propulsion unit. In case of the single propulsion unit, the solution includes a fixed shaft propeller with a rudder or a rotatable thruster including a rudder part. The twin propulsion unit includes two rotatable thrusters with respective rudder parts. The known solution of '096 presents a marine vessel with a single or twin propulsion unit including a very complex modular rotatable thruster unit installed in a tiltable container arrangement at the stern of the ship with a propeller extending aft of the stern. Publication '122 shows a vessel including a single azimuthing propulsion unit with a propeller that may extend aft of the stern de-pending on the operating mode. This may solve the vibration problems in some operational modes of the known vessels, but the known solutions strongly impede propulsion efficiency combined with adequate steering capability.

SUMMARY

An object of the present disclosure is to avoid the drawbacks of prior art and to achieve a marine vessel providing an enhanced degree of efficiency for the vessel both for thrust in a forward and backward direction as well as for steering. This object is attained by a marine vessel according to the claims.

The basic idea of the present disclosure is to achieve a marine vessel that provides efficient thrust performance with low propeller rotation speed and low propeller loading by means of the centerline shaft propulsion unit in combination with efficient steering capabilities by means of the two turnable propulsion units at both cruise speed operation as well as at low speed maneuvering operation. This is achieved by a marine vessel, wherein the propeller of the fixed centerline shaft propulsion unit is arranged at a given distance aft of the stern of the marine vessel. Such an arrangement does not limit the propeller design for securing a high efficiency, whereby propeller pressure excitations do not cause any hindrance. The propeller of the fixed centerline shaft propulsion unit can be designed for high tip loading without any typical cavitation risk features.

The fixed centerline shaft propulsion unit is provided for giving thrust in a forwards and backwards direction. The two turnable propulsion units are provided for the steering of the marine vessel. Thus, the marine vessel according to the present disclosure is without a rudder or any similar construction.

The propeller of the fixed centerline shaft propulsion unit is advantageously arranged at a given distance of 1-5 meters aft of the stern of the marine vessel. This ensures that the propeller can operate freely of the hull of the marine vessel.

In order to reduce the propeller thrust loading coefficient CT the diameter of the propeller of the centerline shaft propulsion unit is at least larger than 75% of the draft of the marine vessel. Advantageously, the diameter of the propeller of the fixed centerline shaft propulsion unit is larger than 80% of the draft of the marine vessel. This also increases open water efficiency of the propeller. The propeller diameter can be chosen in view of achieving an optimal propeller ventilation.

A further measure to enhance efficiency of the propeller of the fixed centerline shaft propulsion unit is to provide it with three to six propeller blades.

The shaft line of the fixed centerline shaft propulsion unit is advantageously arranged within a centerline skeg or a gondola for streamlining purposes.

The shaft line of the fixed centerline shaft propulsion unit is advantageously pro-vided with a support arrangement, such as a V-bracket, I-bracket or a stator for supporting and energy recovering purposes.

The marine vessel is without a rudder or any similar construction since the turnable thrusters provide for the steering of the marine vessel.

The stern of the marine vessel is advantageously provided with a transom. Alter-natively, the marine vessel is advantageously provided with a concave ducktail arranged above sea level.

In case the stern of the marine vessel is provided with a transom, the transom is advantageously provided with a cover arrangement arranged above sea level and arranged to extend at least to the propeller of the fixed centerline propulsion unit. Such an arrangement effectively protects propeller of the fixed centerline propulsion unit from damage, without reducing the advantages achieved by the positioning of the propeller outside the hull of the marine vessel.

In case the stern of the marine vessel is provided with a concave ducktail arranged above sea level and extending at least to the propeller of the fixed centerline propulsion unit, the concave ducktail is advantageously provided with a cover arrangement arranged above sea level and arranged to extend at least to the propeller of the centerline shaft propulsion unit. Such an arrangement effectively protects propeller of the fixed centerline shaft propulsion unit from damage, also from the sides, without reducing the advantages achieved by the positioning of the propeller outside the hull of the marine vessel.

The advantageous embodiments of the marine vessel of the present disclosure are given in dependent claims appended hereto.

The present disclosure also relates to a propulsion arrangement for a marine vessel, as well as a method for providing a marine vessel with a propulsion arrangement.

It should be understood that the drawings are not necessarily drawn to scale and that the disclosed embodiments are sometimes illustrated schematically. It is to be further appreciated that the following detailed description is merely exemplary in nature and is not intended to limit the disclosure or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
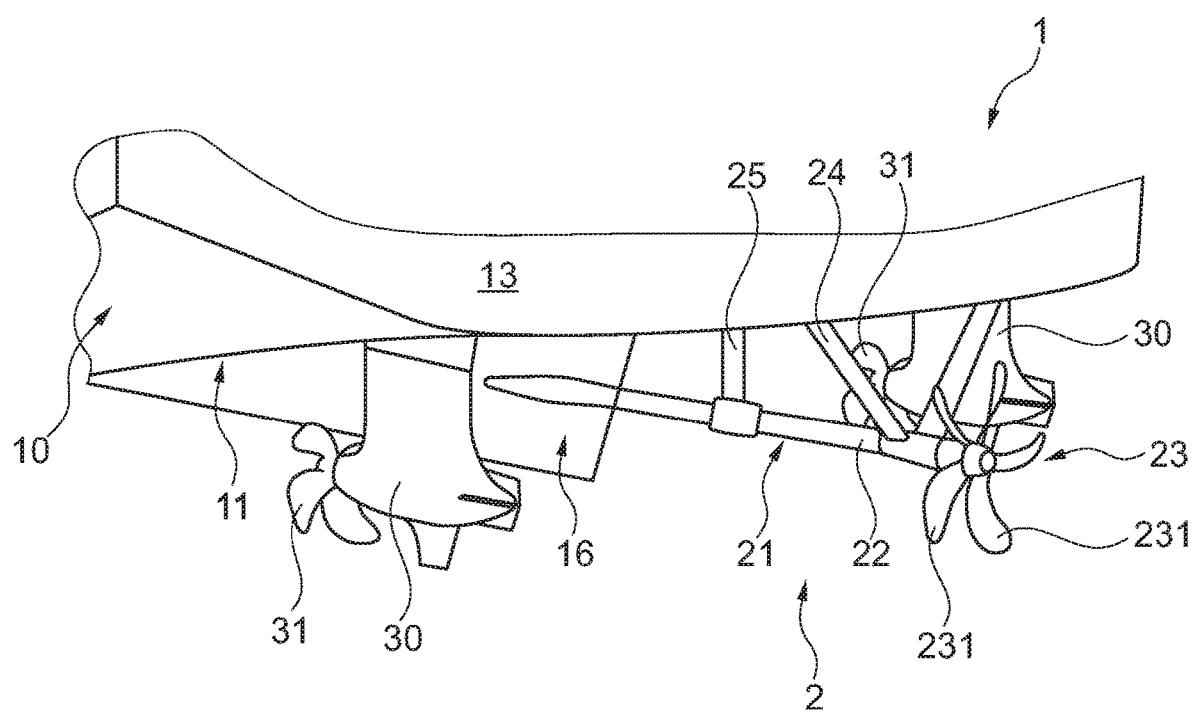
FIG. 1 shows a perspective view of an embodiment of the marine vessel provided with a propulsion arrangement including a fixed centerline shaft propulsion unit and two turnable propulsion units.

FIG. 1 illustrates a marine vessel 1 from the stern side. The marine vessel is provided with a hull 10 with a bottom 11, a bow, a stern 13, and a propulsion arrangement 2 arranged at the stern of the marine vessel. The marine vessel has a centerline skeg 16, a base line 14 (FIGS. 2 and 3) and a centerline 15 (FIG. 3). The bottom 11 approaches and reaches the base line 14.

In this embodiment the marine vessel is provided with a propulsion arrangement 2 including three propulsion units, a fixed centerline shaft propulsion unit 21 with a shaft line 22 and a propeller 23 and two turnable propulsion units 30 with respective propellers 31. The fixed centerline shaft propulsion unit 21 is provided for giving thrust in a forwards and backwards direction. The turnable propulsion units 30 are arranged one on each side of the centerline shaft propulsion unit 21 and are provided for the steering of the marine vessel. The turnable propulsion units 30 are arranged symmetrically and on opposite sides of the centerline shaft propulsion unit 21, i.e. the centerline 15 of the marine vessel 1. The turnable propulsion units can e.g. be azimuthing propulsion units, so-called Z-drives, or other turnable thruster or pod units. Such turnable propulsion units are well known in the art.

The marine vessel does not have, i.e. is without a rudder or any similar construction.

The marine vessel can be provided with additional turnable propulsion units arranged on the sides of the fixed centerline shaft propulsion unit other than the two turnable propulsion units discussed above.

The propeller 23 of the fixed centerline shaft propulsion unit 21 is arranged at a given distance D aft of the stern 13 of the marine vessel 1 (FIGS. 2, 4, 5, 6 and 7). The given distance D is advantageously 1 to 5 meters. A person skilled in the art understands that the values of 1 meter and 5 meters are not precisely exact as such.

The positioning of the propeller 23 outside the hull 10 of the marine vessel 1, i.e. at the given distance D aft of the stern 13 of the marine vessel, provides high propulsion efficiency. This avoids propeller pressure excitations which normally occur when the hull is above the propeller. The propeller 23 of the fixed centerline shaft propulsion unit 21 can thus be designed for high tip loading without the limitation of typical cavitation risk features, which limit open water efficiency. Thus, there are no parts of the marine vessel under water behind or above the propeller 23. The increase of propulsion efficiency can be at least from 5-10% as compared to a typical propeller arrangement under the hull of a marine vessel. This gives substantial savings e.g. in fuel costs. Noise, particularly onboard noise is efficiently reduced by this arrangement.

The positioning of the propeller 23 of the fixed centerline shaft propulsion unit 21 also allows for additional design advantages in view of efficiency. The diameter of the propeller 23 of the centerline shaft propulsion unit 21 is at least larger than 75% of the draft of the marine vessel. Advantageously the diameter is larger than 80% of the draft of the marine vessel. A large propeller diameter reduces the propeller thrust loading coefficient CT.

The propeller 23 of the fixed centerline shaft propulsion unit 21 is advantageously provided with three to six propeller blades for efficiency and underwater noise reduction purposes. In addition, parameters such as pitch distribution, skew angle, blade area, propeller rotational speed and hub shape can be optimized in view of further increasing efficiency and reducing under water noise. In FIG. 1, the propeller 23 is provided with five propeller blades 231. Clearly, the propeller also may be provided with two blades.

Thus, the fixed centerline shaft propulsion unit 21 can be designed to provide high efficiency and maximum thrust capacity for operating the marine vessel in both a forward and a backward direction. The two turnable propulsion units 30 arranged symmetrically at both sides of the centerline shaft propulsion unit 21 can be de-signed for optimum steering capability. The marine vessel can efficiently be operated in a boosting mode with maximum power in the fixed centerline shaft propulsion unit and lower power in the two turnable propulsion units arranged at the sides of the centerline shaft propulsion unit.

Figure 2:
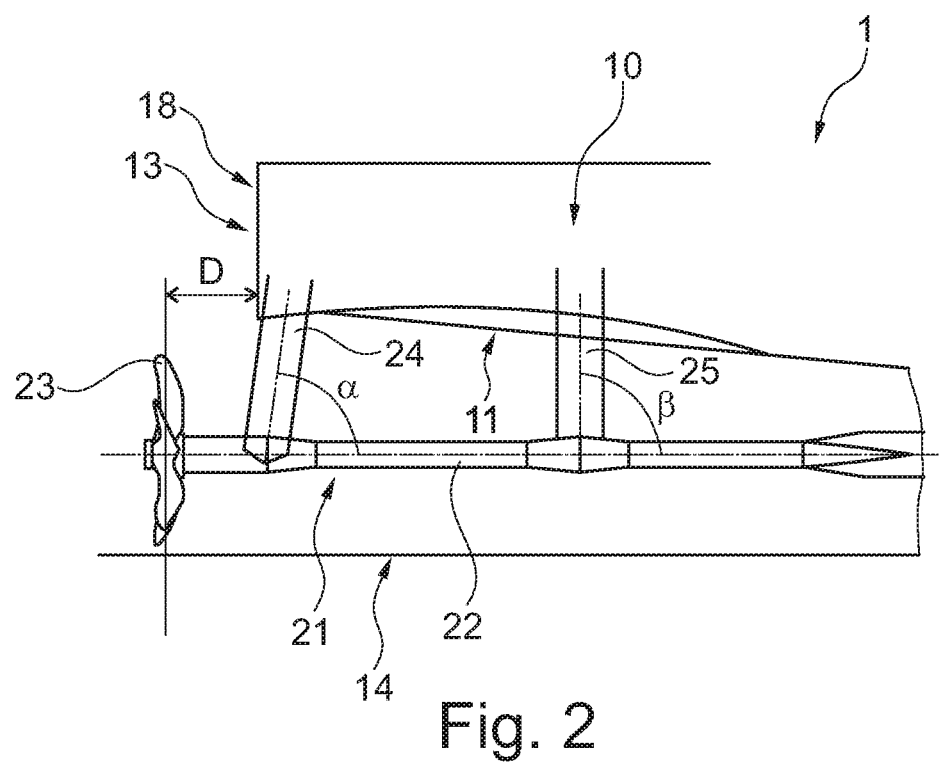
FIG. 2 shows a side view of a support arrangement for the fixed centerline shaft propulsion unit.
Figure 3:
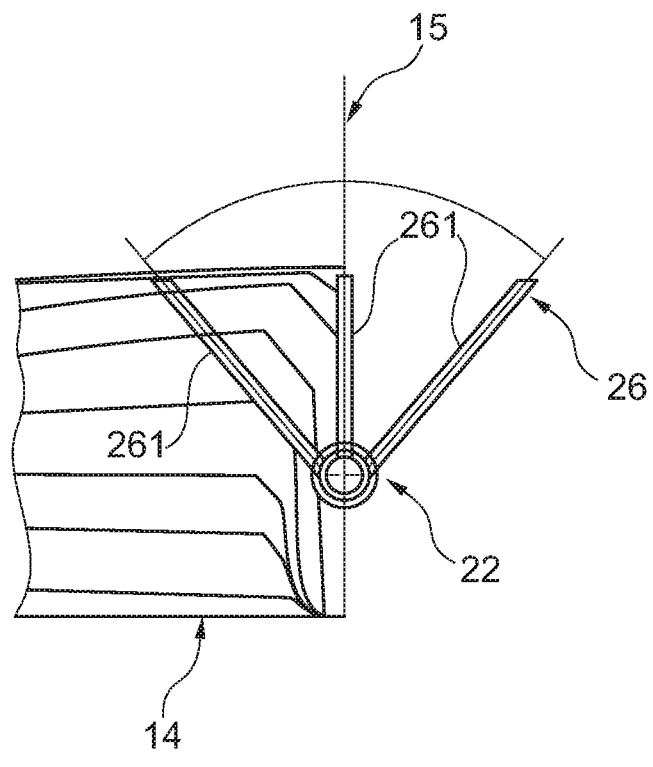
FIG. 3 shows details of an alternative support arrangement for the fixed centerline shaft propulsion unit.

In the embodiment of FIG. 1, and as also shown in FIG. 2, the shaft propulsion unit 21, or more exactly the shaft line 22, is supported to the bottom 11 of the hull 10 by means of a support arrangement. The fixed centerline shaft propulsion unit 21 is arranged within the centerline skeg 16 of the marine vessel 1. FIGS. 1 and 2 shows a support arrangement including a V-bracket 24 and an I-bracket 25. Particularly with regarding to the positioning (as discussed above) of the propeller 23 of the fixed centerline shaft propulsion unit 21 it is advantageous to have the V-bracket 24 arranged at an angle α with respect to the shaft line 22 of the fixed centerline shaft propulsion unit 21, which angle α is less than 90°. The I-bracket 25 is arranged at an angle β of 90° or less with respect to the shaft line 22. A further support arrangement in the form of a stator 26 for the shaft line 22 is shown in FIG. 3. The stator 26 as shown has three stator arms 261. In order to improve efficiency, the stator can be provided with more stator arms, if found necessary for avoiding energy losses.

Figure 4:
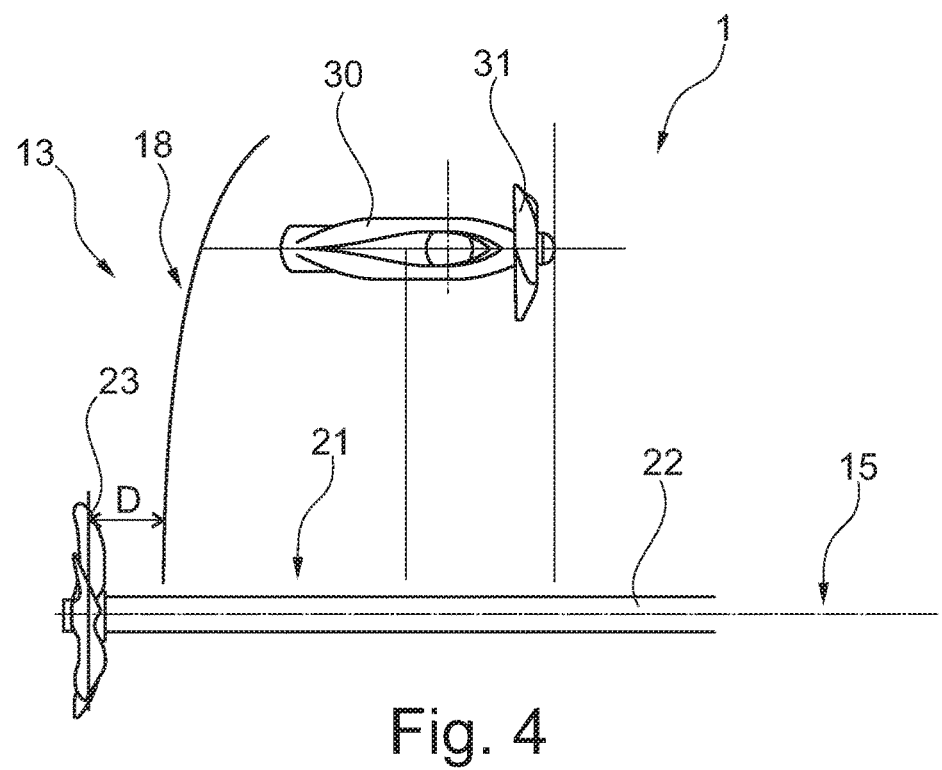
FIG. 4 illustrates the positioning of the propulsion units of the propulsion arrangement according to an embodiment of the present disclosure.

FIG. 4 shows a waterline projection of the positioning of the propulsion units. The figure shows the fixed centerline shaft propulsion unit 21 with the shaft line 22 and the propeller 23 arranged along the centerline 15 of the marine vessel 1. The propeller 23 of the fixed centerline shaft propulsion unit 21 is arranged at the given distance D aft of the stern 13 of the marine vessel 1. A turnable propulsion unit 30 provided with a propeller 31 is arranged on one side of the fixed centerline shaft propulsion unit 21. The turnable propulsion unit 30 including the propeller 31 is arranged forward of the stern 13, towards the bow of the marine vessel, under the bottom of the marine vessel. In this embodiment the stern 13 of the marine vessel is provided with a transom 18. It is to be understood that another turnable propulsion unit is arranged on the opposite side of the centerline shaft propulsion unit 21 in a corresponding manner as the one indicated in FIG. 4. The two turnable propulsion units are provided for the steering of the marine vessel.

Figure 5:
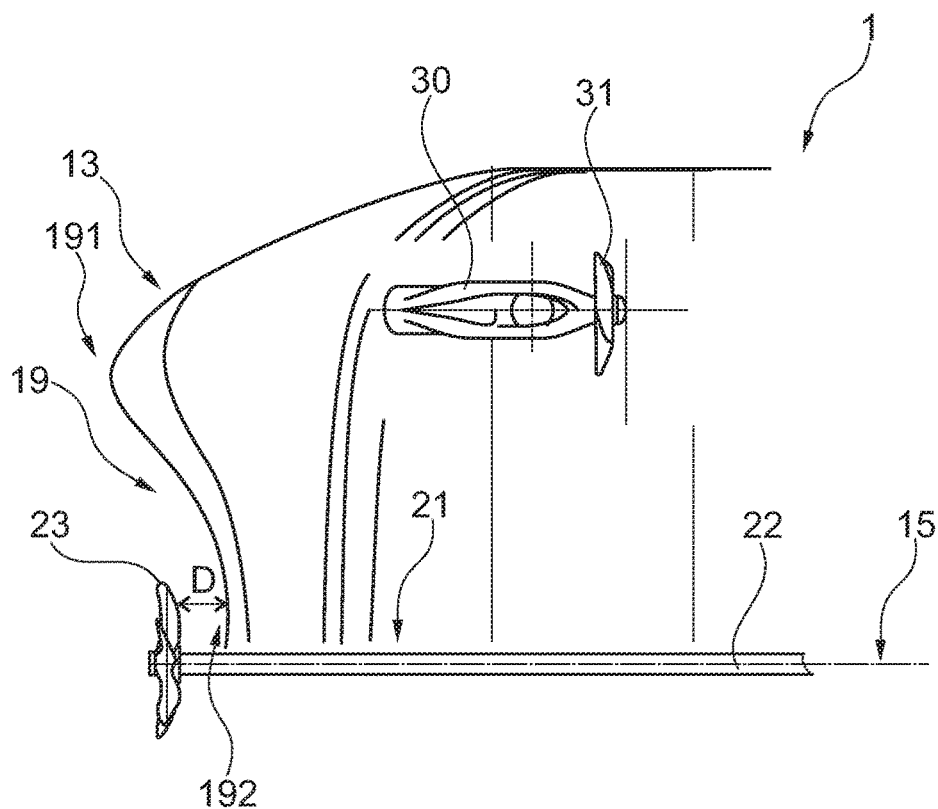
FIG. 5 illustrates the positioning of the propulsion units of the propulsion arrangement according to another embodiment of the present disclosure.

FIG. 5 shows another waterline projection of the positioning of the propulsion units. The main difference with respect to the arrangement shown in FIG. 4 is that the stern 13 is provided with a concave ducktail 19 (FIGS. 9 and 10) extending at least to the propeller 23 of the fixed centerline shaft propulsion unit 21, in this embodiment beyond the propeller 23 in the aft direction. Consequently, the above discussion including the reference numerals apply for this arrangement as well. The con-figuration of the concave ducktail 19 is concave in that it has two projections 191 (FIGS. 9 and 10) on both sides of the centerline 15 extending in a direction aft of the marine vessel and a central recess 192 (FIGS. 9 and 10) converging in an opposite direction, with regards to the projections, towards the centerline 15. The propeller 23 of the centerline shaft propulsion unit 21 is arranged at the given distance D aft of the stern 13 of the marine vessel 1. The two projections 191 are in this embodiment shown to extend beyond the propeller 23 of the centerline shaft propulsion unit 22. Ducktails are well known in the art in will not be discussed in detail in this connection.

Figure 6:
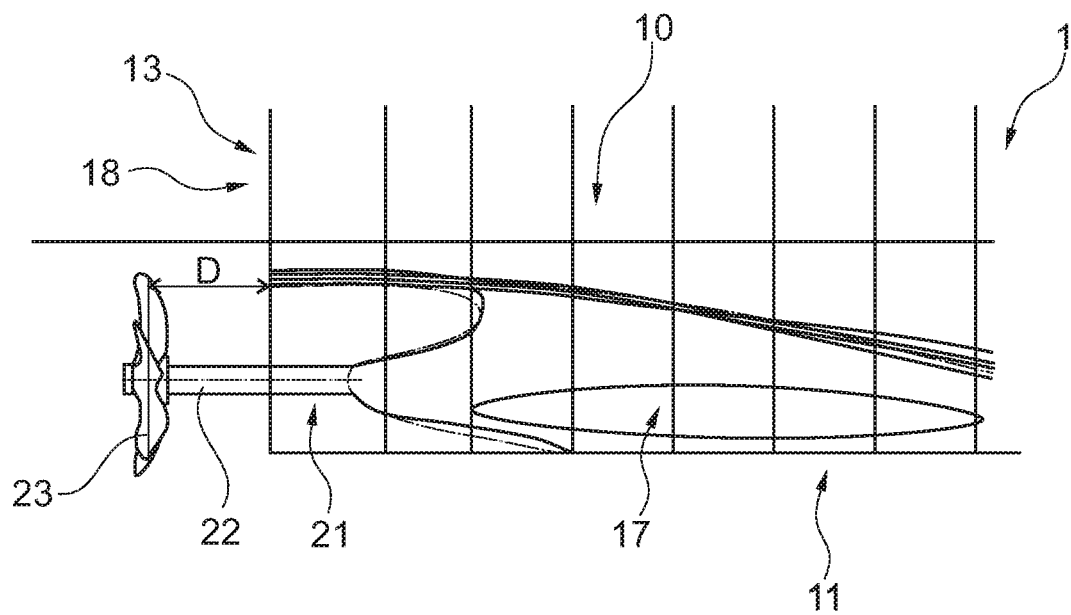
FIG. 6 illustrates an embodiment of the fixed centerline shaft propulsion unit.

FIG. 6 shows the marine vessel 1 provided with an alternative for a centerline skeg 16. The shaft line 22 of the fixed centerline shaft propulsion unit 21 is arranged within a long and streamlined gondola 17 at the bottom 11 of the marine vessel 1, whereby the outstanding shaft line 22 portion can be short.

Figure 7:
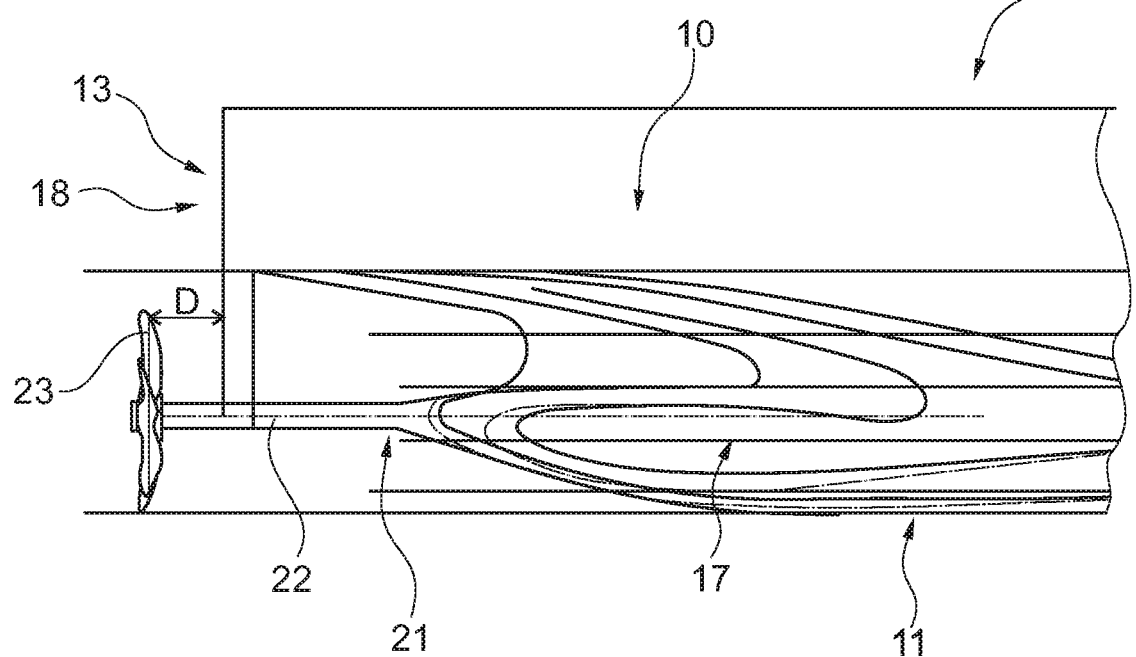
FIG. 7 illustrates another embodiment of the fixed centerline shaft propulsion unit.

FIG. 7 shows the marine vessel, where the shaft line 22 of the fixed centerline shaft propulsion unit 21 is arranged within a short and streamlined gondola 17, whereby the protruding shaft line 22 portion is longer than the short portion as shown in FIG. 6. Gondolas are well known in the art and will not be discussed in detail in this connection.

It is clear that the fixed centerline shaft propulsion unit, as shown in FIGS. 6 and 7, also can be provided with a suitable support arrangement which takes into account e.g. the overall design of the marine vessel, the centerline shaft propulsion unit, and any operational conditions of the marine vessel. Such support arrangements are discussed above.

Figure 8:
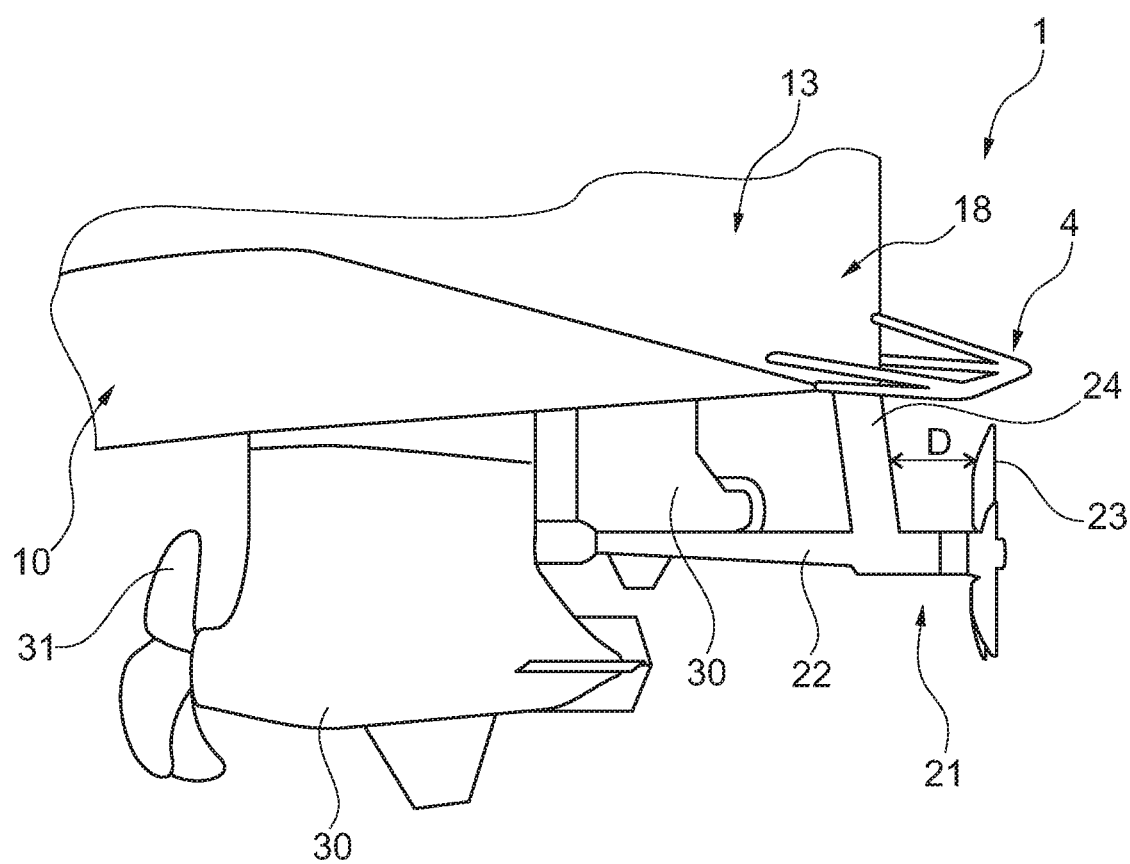
FIG. 8 illustrates a further embodiment of the fixed centerline shaft propulsion unit.

FIG. 8 shows an embodiment corresponding to the embodiment shown in FIG. 1. The marine vessel 1 is shown from the stern side. The fixed centerline shaft propulsion unit 21 with a shaft line 22 and a propeller 23 is arranged at the given distance D aft of the stern 13 of the marine vessel 1. The shaft line 22 is shown to be supported by a support arrangement in the form of a V-bracket 24. The stern 13 of the marine vessel is provided with a transom 18. The transom 18 is provided with a cover arrangement 4 arranged above sea level and arranged to extend aftwards at least to the propeller 23 of the fixed centerline shaft propulsion unit 21. In this embodiment the cover arrangement 4 extends somewhat beyond the propeller 23 in the aft direction. The cover arrangement 4 is advantageous for protecting the propeller 23 of the centerline shaft propulsion unit 21 taking into account its positioning according to the disclosure. The cover arrangement can e.g. be a grid or a metal tube construction. As the cover arrangement is arranged above sea level, it has not influence of the advantages of the present disclosure.

Figure 9:
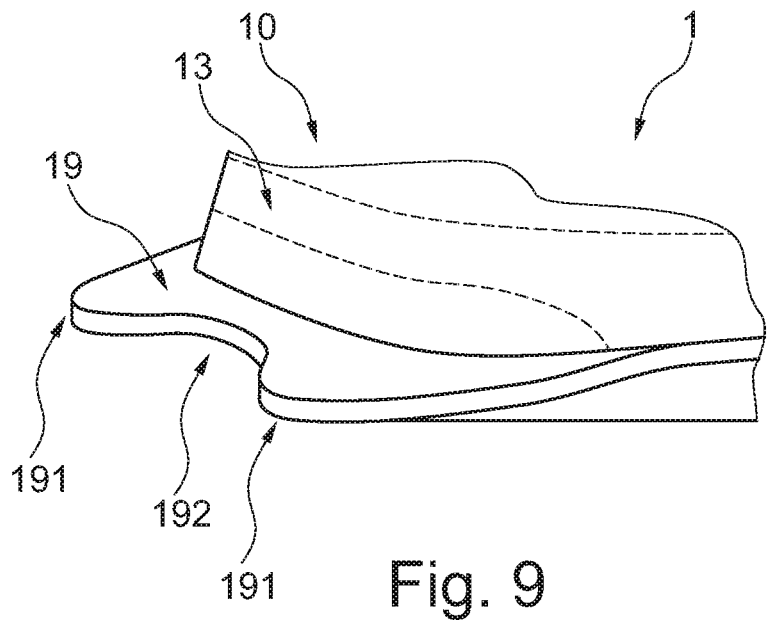
FIG. 9 illustrates a perspective view of the embodiment of FIG. 5.
Figure 10:
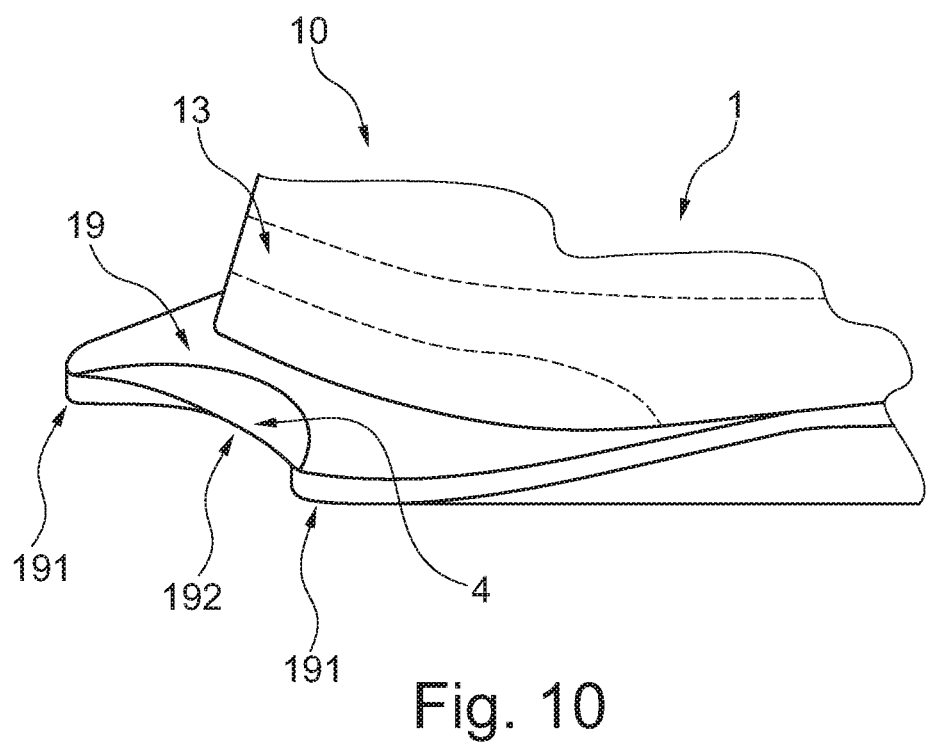
FIG. 10 illustrates an alternative arrangement in view of FIG. 9.

FIG. 9 illustrates a perspective view of a marine vessel 1 provided with a concave ducktail 19 at the stern 13 as discussed above in connection with FIG. 5. FIG. 10 illustrates how the stern 13 provided with the concave ducktail 19 can be provided with a cover arrangement 4 for protecting the propeller 23 of the fixed centerline shaft propulsion unit 21. As the cover arrangement is arranged above sea level, it has not influence of the advantages of the present disclosure.

The drawings and the description related thereto are only intended for clarification of the basic idea of the disclosure. The disclosure may vary in detail within the scope of the ensuing claims.

What is claimed is:

1. A marine vessel with a hull having a bottom, a bow, and a stern, the marine vessel further including a propulsion arrangement having at least three propulsion units arranged at the stern of the marine vessel, and which marine vessel has a base line and a centerline, wherein the at least three propulsion units include a fixed centerline shaft propulsion unit, with a shaft line and a propeller, for giving thrust in both a forward direction and a backward direction, and two turnable propulsion units with respective propellers and arranged at opposite sides of the fixed centerline shaft propulsion unit for steering of the marine vessel, wherein the propeller of the fixed centerline shaft propulsion unit is arranged at a given distance (D) aft of the stern of the marine vessel.

2. The marine vessel of claim 1, in which the given distance (D) is 1 to 5 meters.

3. The marine vessel of claim 1, in which a diameter of the propeller of the fixed centerline shaft propulsion unit is larger than at least 75% of a draft of the marine vessel.

4. The marine vessel of claim 3, in which the diameter of the propeller of the fixed centerline shaft propulsion unit is larger than 80% of the draft of the marine vessel.

5. The marine vessel of claim 1, in which the propeller of the fixed centerline shaft propulsion unit includes three to six propeller blades.

6. The marine vessel of claim 1, in which the shaft line is disposed within a centerline skeg or a gondola.

7. The marine vessel of claim 1, in which the shaft line includes a support selected from a group of supports consisting of a V-bracket, an I-bracket, or a stator.

8. The marine vessel of claim 1, in which the marine vessel is without a rudder or any similar construction.

9. The marine vessel of claim 1, in which the stern of the marine vessel is provided with a transom.

10. The marine vessel of claim 1, in which the stern of the marine vessel is provided with a concave ducktail arranged above sea level and extending at least to the propeller of the fixed centerline shaft propulsion unit.

11. The marine vessel of claim 9, in which the transom is provided with a cover arrangement positioned above sea level and arranged to extend at least to the propeller of the fixed centerline shaft propulsion unit.

12. The marine vessel of claim 10, in which the concave ducktail is provided with a cover arrangement positioned above sea level and arranged to extend at least to the propeller of the fixed center-line shaft propulsion unit.

13. A propulsion arrangement for a marine vessel, which marine vessel has a hull with a bottom, a bow, a stern, a base line and a centerline, wherein the propulsion arrangement includes at least three propulsion units arranged at the stern of the marine vessel, and wherein the at least three propulsion units include a fixed centerline shaft propulsion unit, with a shaft line and a propeller, for giving thrust in both a forward direction and a backward direction, and two turnable propulsion units with respective propellers arranged at opposite sides of the fixed centerline shaft propulsion unit for steering of the marine vessel, wherein that the propeller of the fixed centerline shaft propulsion unit is arranged at a given distance (D) aft of the stern of the marine vessel.

14. The propulsion arrangement of claim 13, in which the given distance (D) is 1 to 5 meters.

15. The propulsion arrangement of claim 13, in which a diameter of the propeller of the fixed centerline shaft propulsion unit is larger than at least 75% of a draft of the marine vessel.

16. The propulsion arrangement of claim 15, in which the diameter of the propeller of the fixed centerline shaft propulsion unit is larger than 80% of the draft of the marine vessel.

17. The propulsion arrangement of claim 13, in which the propeller of the fixed centerline shaft propulsion unit includes three to six propeller blades.

18. The propulsion arrangement of claim 13, in which the shaft line is disposed within a centerline skeg or a gondola.

19. The propulsion arrangement of claim 13, in which the shaft line includes a support selected from a group of supports consisting of a V-bracket, an I-bracket, or a stator.

20. The propulsion arrangement of claim 13, in which the marine vessel is without a rudder or any similar construction.

21. A method for providing a marine vessel with a propulsion arrangement, which marine vessel has a hull with a bottom, a bow, a stern, a base line and a centerline, in which method the marine vessel is provided with at least three propulsion units at the stern of the marine vessel, wherein in the at least three propulsion units are included a fixed centerline shaft propulsion unit, with a shaft line and a propeller, for giving thrust in both a forward direction and a backward direction, and two turnable propulsion units with respective propellers arranged at opposite sides of the fixed centerline shaft propulsion unit for steering of the marine vessel, wherein the propeller of the centerline shaft propulsion unit is arranged at a given distance (D) aft of the stern of the marine vessel.

22. The method of claim 21, in which the given distance (D) is 1 to 5 meters.

23. The method of claim 21, in which a diameter of the propeller of the fixed centerline shaft propulsion unit is larger than at least 75% of a draft of the marine vessel.

24. The method of claim 23, in which the diameter of the propeller of the fixed centerline shaft propulsion unit is larger than 80% of the draft of the marine vessel.

25. The method of claim 21, in which the propeller of the fixed centerline shaft propulsion unit includes three to six propeller blades.

26. The method of claim 21, in which the shaft line is disposed within a centerline skeg or a gondola.

27. The method of claim 21, in which the shaft line includes a support selected from a group of supports consisting of a V-bracket, an I-bracket, or a stator.

28. The method of claim 21, in which the marine vessel is without a rudder or any similar construction.

* * * * *